(12) United States Patent
Hara et al.

(10) Patent No.: US 11,996,895 B2
(45) Date of Patent: May 28, 2024

(54) OPTICAL COMMUNICATION SYSTEM AND CONTROL METHOD

(71) Applicant: NIPPON TELEGRAPH AND TELEPHONE CORPORATION, Tokyo (JP)

(72) Inventors: Kazutaka Hara, Musashino (JP); Yasutaka Kimura, Musashino (JP); Atsuko Kawakita, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/798,068

(22) PCT Filed: Feb. 12, 2020

(86) PCT No.: PCT/JP2020/005333
§ 371 (c)(1),
(2) Date: Aug. 5, 2022

(87) PCT Pub. No.: WO2021/161414
PCT Pub. Date: Aug. 19, 2021

(65) Prior Publication Data
US 2023/0082934 A1 Mar. 16, 2023

(51) Int. Cl.
*H04B 10/61* (2013.01)
*H04B 10/25* (2013.01)

(52) U.S. Cl.
CPC ..... *H04B 10/614* (2013.01); *H04B 10/25891* (2020.05)

(58) Field of Classification Search
CPC ............ H04B 10/614; H04B 10/25891; H04B 10/272; H04B 10/27; H04B 10/40;
(Continued)

(56) References Cited

U.S. PATENT DOCUMENTS 5,009,478 A * 4/1991 Sasaki .................. G02B 6/2835
385/39
2003/0095314 A1 5/2003 Shimada et al.
(Continued)

FOREIGN PATENT DOCUMENTS

EP 1306990 A2 * 5/2003 ............. H04B 10/27
JP 2003134049 A 5/2003
JP 2003249901 A 9/2003

OTHER PUBLICATIONS

Atsuko Kawakita et al., Long-Reach Optical Access Networks by Splitting Ratio Determination Process with Unsymmetrical Optical Splitter, 2018 IEICE Society Conference, Sep. 11, 2018.
(Continued)

*Primary Examiner* — Hibret A Woldekidan
(74) *Attorney, Agent, or Firm* — Harness, Dickey & Pierce, P.L.C.

(57) ABSTRACT

In order to solve the problems described above, an object of the present invention is to provide an optical communication system and a control method that automatically adjust a branching ratio of an optical splitter in accordance with a connection of a new ONU. An optical communication system according to the present invention causes an operation system or a DBA (Dynamic Bandwidth Allocation) function and a determining unit of a branching ratio of an optical splitter to cooperate with each other, adjusts the branching ratio so as to enable ranging with an active ONU, and takes into consideration an initial connection sequence through which an ONU is newly connected.

6 Claims, 7 Drawing Sheets

(58) Field of Classification Search
CPC .......................... H04B 10/43; H04B 10/2587; H04Q 11/0067; H04Q 2011/0086; H04J 14/0221; G02B 2006/1215; G02B 2006/12154; G02B 6/125; G02B 6/283
See application file for complete search history.

(56) References Cited

U.S. PATENT DOCUMENTS

2011/0249940 A1* 10/2011 Sasaoka ............... G02B 6/2821
                                                       385/39
2020/0235819 A1*  7/2020 Goebuchi .............. H04B 10/61

OTHER PUBLICATIONS

Norio Tamaki et al., A guard time estimation method for TCM-TDMA PDS system considering N-th order fresnel reflections, IEICE Transactions on Communications, vol. E82-B, No. 8, 1999, pp. 1311-1317.

* cited by examiner

| BRANCH PORT NUMBER OF UNEQUAL BRANCH OPTICAL SPLITTER | PORT NUMBER OF SECOND-STAGE OPTICAL SPLITTER | ONU CONNECTION STATUS | ONU INSTALLATION ADDRESS | DISTANCE (km) |
|---|---|---|---|---|
| PORT 2 | 1 | Active | NO. B-1, A TOWN | l1 |
| | 2 | Active | NO. B-3, A TOWN | l2 |
| | ... | | | |
| | 8 | Non-active | | |
| PORT 3 | 1 | Negative | | |
| | 2 | Active | NO. C-1, A TOWN | l3 |
| | ... | | | |
| | 8 | Active | NO. C-16, A TOWN | l4 |
| PORT 4 | 1 | Non-active | | |
| | 2 | Active | NO. D-3, A TOWN | l5 |
| | ... | | | |
| | 7 | Non-active -> Active | NO. D-13, A TOWN | l6 |
| | 8 | Active | NO. D-11, A TOWN | l7 |

Fig. 7

| BRANCHING RATIO | | Lx (μm) | VOLTAGE (V) |
|---|---|---|---|
| X(%) | 100-X (%) | | |
| 1 | 99 | 1.01 | 1.2 |
| 2 | 98 | 1.05 | 1.3 |
| . . | . . | . . | . . |
| 99 | 1 | 0.64 | 2.8 |

| BRANCHING RATIO | | Ly (μm) | VOLTAGE (V) |
|---|---|---|---|
| Y(%) | 100-Y (%) | | |
| 1 | 99 | 1.01 | 1.2 |
| 2 | 98 | 1.05 | 1.3 |
| . . | . . | . . | . . |
| 99 | 1 | 0.64 | 2.8 |

| BRANCHING RATIO | | Lz (μm) | VOLTAGE (V) |
|---|---|---|---|
| Z(%) | 100-Z (%) | | |
| 1 | 99 | 1.01 | 1.3 |
| 2 | 98 | 1.05 | 1.3 |
| . . | . . | . . | . . |
| 99 | 1 | 0.64 | 2.8 |

OPTICAL COMMUNICATION SYSTEM AND CONTROL METHOD

CROSS-REFERENCE TO RELATED APPLICATIONS

This application is a 371 U.S. National Phase of International Application No. PCT/JP2020/005333, filed on Feb. 12, 2020. The entire disclosure of the above application is incorporated herein by reference.

TECHNICAL FIELD

The present disclosure relates to an optical communication system such as a PON (passive optical network) and to a control method thereof.

BACKGROUND ART

With the explosive diffusion of the Internet, the number of subscribers to FTTH (Fiber to the home) that provides high-speed communication services has increased. While existing FTTH services use a 1G-EPON (gigabit-ethernet passive optical network) with a communication speed of 1 Gbit/s, there are demands for further wider bandwidths toward the future in order to accommodate increases in the number of subscribers as the Internet spreads further, applications to a backhaul line of fifth generation mobile communication systems and IoT (Internet of Things), distribution services of 4K/8K high definition video, and the like. Currently, in order to address such demands, evaluations of 10G-EPON which has already been standardized, 40 Gbit/s class PONs (ITU-T Rec G. 989 series), and 50 Gbit/s class next generation PON systems (IEEE 802.3 ca) are being vigorously discussed by standards bodies such as IEEE and ITU.

Generally, FTTH services have introduced TDM-PON systems based on time division multiplexing (TDM) as a multiplexing technique and a double star type topology as a network topology in order to accommodate subscribers spread in a plane in an efficient and economic manner and, recently, a reduction in apparatus cost per user and a reduction in power due to station integration are desired in response to a reduction in the number of apparatuses caused by area expansion due to longer distances. While conceivable length-extending techniques in an access network include using a semiconductor optical amplifier (SOA) or a rare earth-doped optical fiber amplifier, since both techniques involve directly amplifying an optical signal based on a principle of stimulated emission and require a current source, there is a risk of causing a decline in MTBF (Mean Time Between Failures) of an entire system due to securing power or using an active element.

In addition, a user distribution in an access network is known to be a $\chi^2$ distribution such as that shown in NPL 2 instead of a uniform distribution centered on a central office of a communication service provider. This means that a population density of users in the vicinity of the central office of the communication service provider is high but a population density of far-away users is low, and applying a conventional PON system to such a distribution is problematic in that efficiency of light energy exchanged between an OLT and an ONU is low. As a method of solving the two problems respectively related to an optical amplifier that enables direct amplification of an optical signal and energy efficiency according to user distribution, NPL 1 demonstrates a method which enables, with respect to an uneven user distribution, a transmission-reached distance of a farthest user to be extended or the number of connectible users to be increased using only a passive optical device by changing a branch configuration and a branching ratio of a splitter.

CITATION LIST

Non Patent Literature

[NPL 1] 2018 IEICE Society Conference, lecture number B-8-23, Sep. 2018

[NPL 2] N. Tamaki, H. Kimura, and R. Watanabe "A guard time estimation method for TCM-TDMA PDS system considering N-th order fresnel reflections," IEICE Trans. Commun., vol. E82-B, no. 8, pp. 1311-1317, August 1999.

SUMMARY OF THE INVENTION

Technical Problem

NPL 1 shows that, in a passive double star type PON system, by adjusting a branch configuration or a branching ratio of an optical splitter in a first stage so that each beam of light output from a farthest ONU subordinately connected to each output port of the optical splitter installed in the first stage arrives at minimum reception sensitivity of an optical receiver installed inside an OLT, communication can be established with all of the ONUs and a transmission-reached distance of a farthest user can be extended or the number of connectible users can be increased. Furthermore, a system is shown which automatically adjusts a branching ratio of a first-stage splitter by utilizing a ranging function of the PON system to measure a transmission distance between the OLT and each ONU, registering a result thereof in a database such as a management table, and having the OLT perform calculation processing of the branching ratio in accordance with the policy described above.

However, when a new ONU is newly connected to the PON system, depending on the branching ratio of the optical splitter, reception sensitivity may fall below the minimum reception sensitivity of the optical receiver installed in the ONU. In such a case, it may be difficult to perform ranging in a normal manner. In other words, conventional PON systems have a problem in that a method is required to avoid a situation where connecting a new ONU prevents ranging from being performed.

In consideration thereof, in order to solve the problems described above, an object of the present invention is to provide an optical communication system and a control method that automatically adjust a branching ratio of an optical splitter in accordance with a connection of a new ONU.

Means for Solving the Problem

In order to achieve the object described above, an optical communication system according to the present invention: causes an operation system or a DBA (Dynamic Bandwidth Allocation) function and a determining unit of a branching ratio of an optical splitter to cooperate with each other; adjusts the branching ratio so as to enable ranging with an active ONU; and takes into consideration an initial connection sequence through which an ONU is newly connected.

Specifically, the optical communication system according to the present invention is an optical communication system including a single unequal branch optical splitter which is capable of varying a branching ratio of light and a control apparatus, the unequal branch optical splitter including:

a single merge port to which an OLT (Optical Line Terminal) is connected;

N-number (where N is an integer equal to or larger than 2) of branch ports to which a PON (Passive Optical Network) including an ONU (Optical Network Unit) is connected; and N-1-number of branch units including a single first port on a side of the merge port, two second ports on a side of the branch port, and a varying mechanism which varies a branching ratio of light from the first port to each of the second ports under an instruction from the control apparatus, wherein the branch units are coupled such that one of the second ports is connected to the branch port and the other second port is connected to the first port of the branch unit of a next stage, and in the branch unit of a first stage among the branch units, the first port is connected to the merge port, and in the branch unit of a final stage, the second ports are respectively connected to the branch port.

The present optical communication system is capable of adjusting the branching ratio of an optical splitter under an instruction from a control apparatus. Therefore, when connecting a new ONU, a situation where ranging cannot be performed can be avoided by having the control apparatus adjust the branching ratio of the optical splitter. Therefore, the present invention can provide an optical communication system that automatically adjusts a branching ratio of an optical splitter in accordance with a connection of a new ONU.

A first method of the control apparatus is as follows.

The control apparatus:

includes a management information database which stores, with respect to each of the ONUS, the branch port to which the ONU is connected and a distance from the OLT;

when the new ONU is connected, instructs the varying mechanism to set a branching ratio of light to the branch port to which the new ONU is connected to 100% when a distance between the new ONU and the OLT is longer than any of the distances stored in the management information database;

performs ranging with respect to the new ONU and acquires a distance between the new ONU and the OLT;

calculates a branching ratio of light to each of the branch ports based on all of the distances including the distance to the new ONU; and instructs all of the varying mechanisms so that the branching ratio of light is set.

In other words, a control method according to the present invention is a control method of an optical communication system including the management database and the single unequal branch optical splitter which is capable of varying a branching ratio of light, the control method including the steps of:

when the new ONU is connected, instructing the varying mechanism to set a branching ratio of light to the branch port to which the new ONU is connected to 100% when a distance between the new ONU and the OLT is longer than any of the distances stored in the management information database;

performing ranging with respect to the new ONU and acquiring a distance between the new ONU and the OLT;

calculating a branching ratio of light to each of the branch ports based on all of the distances including the distance to the new ONU; and instructing all of the varying mechanisms so that the branching ratio of light is set.

In addition, a second method of the control apparatus is as follows.

The control apparatus:

when a discovery function detects that the new ONU is connected, for each of the branch ports, instructs the varying mechanism to set a branching ratio of light to the branch port to 100%, performs ranging with respect to all of the ONUS connected to the branch port, and acquires distances between the ONUS and the OLT;

after performing the ranging with respect to all of the branch ports, calculates a branching ratio of light to each of the branch ports based on all of the distances obtained as a result of the ranging; and instructs all of the varying mechanisms so that the branching ratio of light is set.

In other words, a control method according to the present invention is a control method of an optical communication system including the single unequal branch optical splitter which is capable of varying a branching ratio of light, the control method including the steps of:

when a discovery function detects that the new ONU is connected, for each of the branch ports, instructing the varying mechanism to set a branching ratio of light to the branch port to 100%, performing ranging with respect to all of the ONUs connected to the branch port, and acquiring distances between the ONUs and the OLT;

after performing the ranging with respect to all of the branch ports, calculating a branching ratio of light to each of the branch ports based on all of the distances obtained as a result of the ranging; and instructing all of the varying mechanisms so that the branching ratio of light is set.

Effects of the Invention

The present invention can provide an optical communication system and a control method that automatically adjust a branching ratio of an optical splitter in accordance with a connection of a new ONU.

DESCRIPTION OF EMBODIMENTS

Hereinafter, embodiments of the present invention will be described with reference to the accompanying drawings. It is to be understood that the embodiments described below are examples of the present invention and that the present invention is not limited to the embodiments described below. It is also to be understood that constituent elements with a same reference sign in the present specification and in the drawings represent constituent elements that are mutually the same.

First Embodiment

The first embodiment will be described with reference to FIGS. 1, 2, 6, and 7.

Figure 1:
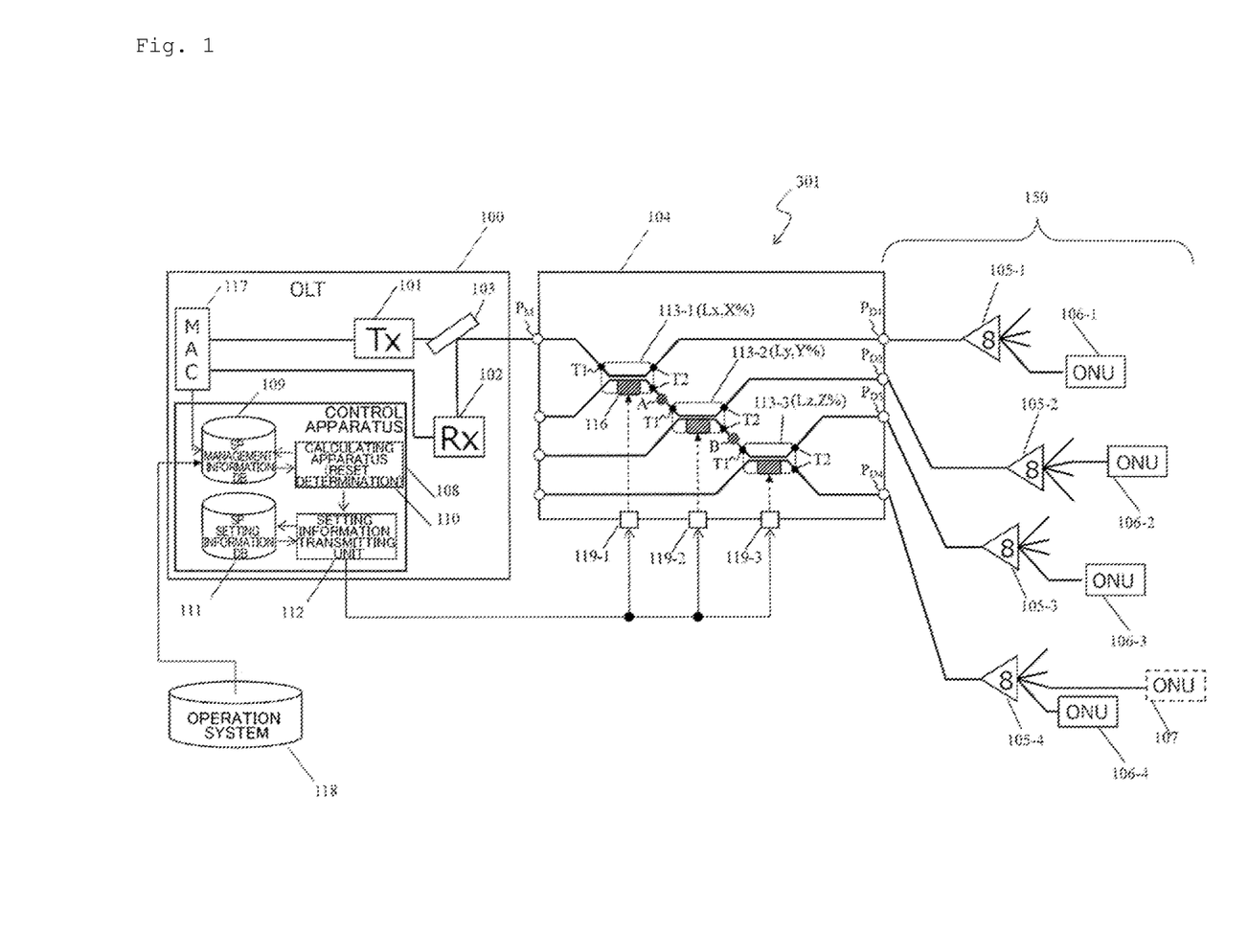
FIG. 1 is a diagram for describing an optical communication system according to the present invention.

FIG. 1 shows an optical communication system 301 according to the present embodiment. The optical communication system 301 is an optical communication system including a single unequal branch optical splitter 104 which is capable of varying a branching ratio of light and a control apparatus 108, the unequal branch optical splitter 104 including:

a single merge port $P_M$ to which an OLT 100 is connected;

N-number (where N is an integer equal to or larger than 2) of branch ports $P_D$ to which a PON 150 including an ONU 106 is connected; and N−1-number of branch units 113 including a single first port T1 on a side of the merge port $P_M$, two second ports T2 on a side of the branch port $P_D$, and a varying mechanism 116 which varies a branching ratio of light from the first port T1 to each of the second ports T2 under an instruction from the control apparatus 108, wherein the branch units 113 are coupled such that one of the second ports T2 is connected to the branch port $P_D$ and the other second port T2 is connected to the first port T1 of the branch unit 113 of a next stage, and in the branch unit 113-1 of a first stage among the branch units 113, the first port T1 is connected to the merge port $P_M$, and in the branch unit 113-N−1 of a final stage, the second ports T2 are respectively connected to the branch port $P_D$.

The optical communication system 301 is a double star type PON system. A difference between the optical communication system 301 and a conventional PON system is that the optical communication system 301 includes the branching ratio-variable type unequal branch optical splitter 104 which is capable of varying a branching ratio. Optical splitters are roughly divided into fiber-type optical splitters in which a plurality of optical fiber cores are fused and drawn to weaken an optical confinement effect of the cores and light is coupled to an adjacent fiber and waveguide-type optical splitters in which a semiconductor processing technique such as photolithography is used to form an optical circuit on a silica glass substrate or a silicon substrate. It should be noted that, in the present embodiment, the unequal branch optical splitter 104 with four branches (N=4) of which an asymmetric structure is uniquely determined will be described for the sake of brevity.

Reference number 100 denotes an OLT (Optical Line Terminal) installed at a central office of a communication service provider, 101 denotes an optical transmitter which transmits a downstream signal, 102 denotes an optical receiver which receives an upstream signal, 103 denotes a transmission/reception separating filter for realizing single-core bidirectional communication, 104 denotes the branching ratio-variable unequal branch optical splitter described earlier, 105-1 to 105-4 denote optical splitters (in the diagram, eight branches) with a symmetrical structure, 106-1 to 106-4 denote active farthest ONUs subordinately connected to each branch port PD that is subordinate to the unequal branch optical splitter 104, 107 denotes an ONU to be newly connected, 108 denotes a branching ratio determining unit, 109 denotes an optical splitter management information database (SP management information DB), 110 denotes an calculating apparatus, 111 denotes a splitter setting information database (SP setting information DB), 112 denotes a setting information transmitting unit, 113-1 to 113-3 denote branch units, 116 denotes a drive stage, 117 denotes a MAC-LSI (Media Access Control Large Scale Integration), 118 denotes an operation system, and 119-1 to 119-3 denote input IFs to the unequal branch optical splitter 104.

For example, if the unequal branch optical splitter 104 is the optical fiber-type described earlier, a branching ratio can be varied by bringing optical fiber cores of the branch unit 113 close to each other and changing a coupling efficiency of an evanescent field in accordance with a distance (Lx, Ly, Lz) between cores. In this case, branching ratios (X, Y, and Z) are defined as follows. The branching ratio X is a ratio between intensity of light input from the merge port $P_M$ and intensity of light output from a branch port $P_{D1}$ via the branch unit 113-1. Therefore, a branching ratio at a point A of light input from the merge port $P_M$ can be expressed as (1−X) %. In a similar manner, a branching ratio between light input to the branch unit 113-2 and light output from a branch port $P_{D2}$ via the branch unit 113-2 is defined as Y %, a branching ratio at a point B is defined as (1−Y) %, a branching ratio between light input to the branch unit 113-3 and light output from a branch port $P_{D3}$ via the branch unit 113-3 is defined as Z %, and a branching ratio to a branch port $P_{D4}$ is defined as (1−Z) %.

Figure 2:
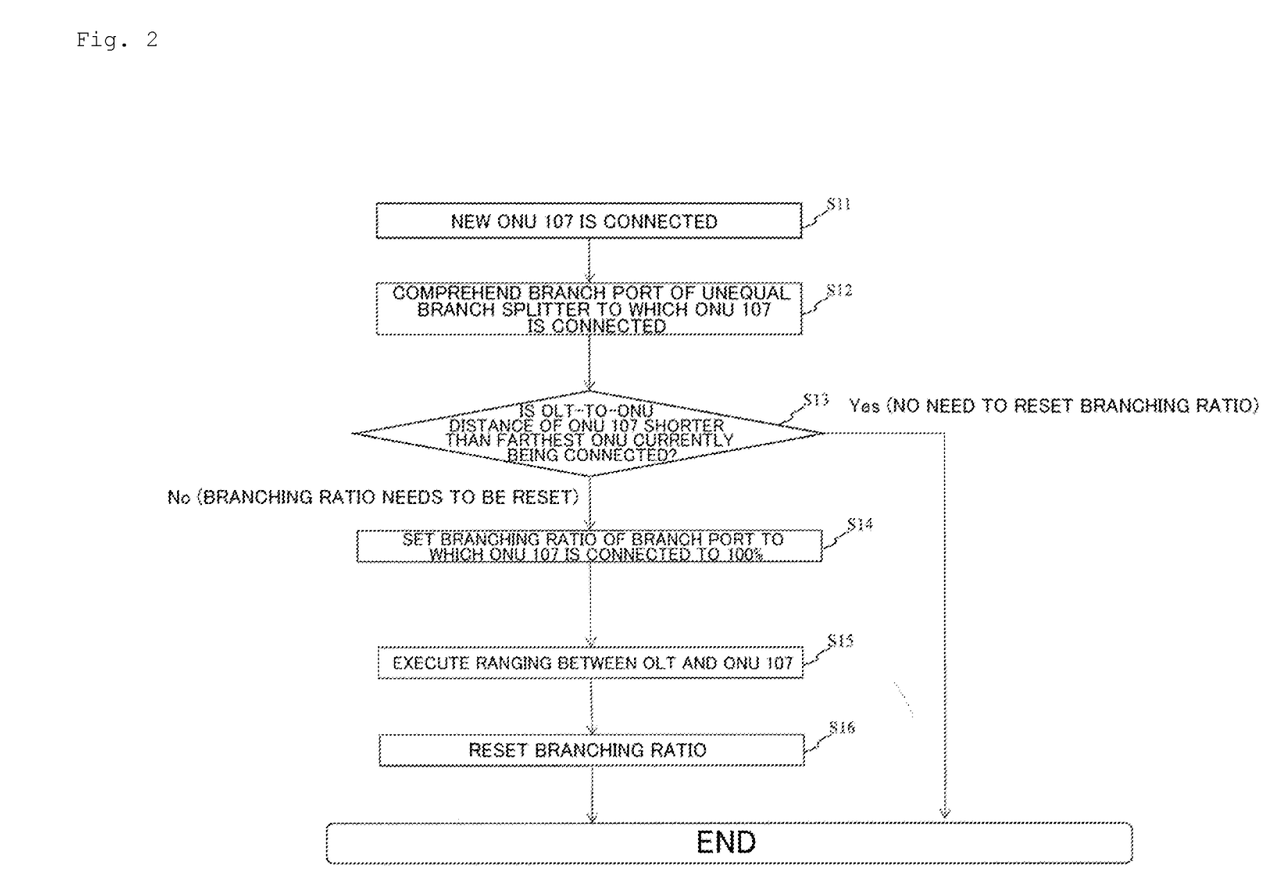
FIG. 2 is a flow chart for describing a control method according to the present invention.

FIG. 2 is a flowchart regarding a branching ratio setting when an ONU (the ONU 107 in FIG. 1) is newly connected to the system in operation. In the present embodiment, a case where the control apparatus performs the first method will be described. The first method includes:

when the new ONU 107 is connected (step S11), confirming the branch port $P_D$ to which the PON 150 including the ONU 107 is connected (step S12);

when a distance between the ONU 107 and the OLT 100 is longer than any of the distances (distances between other ONUS 106 and the OLT 100) stored in the management information database 109 ("No" in step S13), instructing the varying mechanism 116 to set a branching ratio of light to the branch port $P_D$ to which the ONU 107 is connected to 100% (step S14);

performing ranging with respect to the ONU 107 and acquiring a distance between the ONU 107 and the OLT 110 (step S15); and calculating a branching ratio of light to each of the branch ports $P_D$ based on all of the distances including the distance to the ONU 107 and instructing all of the varying mechanisms 116 so that the branching ratio of light is set (step S16).

In step S13, a determination is made as to whether the distance between the newly connected ONU 107 and the OLT 100 is shorter or farther than the farthest ONU (in FIG. 1, an ONU 106-4 that is subordinate to the branch port $P_{D4}$) being connected. Since ranging is not completed at this point, a provisional value (for example, a value estimated from an address of the ONU 107) is used as the distance between the ONU 107 and the OLT 100. When the distance between the ONU 107 and the OLT 100 is shorter than the farthest ONU (in FIG. 1, the ONU 106-4) being connected, the branching ratio need not be reset ("Yes" in step S13).

This is because the branching ratio is set so that light output from the farthest ONU that is subordinately connected to the branch port PD of the unequal branch optical splitter 104 is minimum reception sensitivity of the optical receiver 102 installed inside the OLT 100.

On the other hand, when the distance between the newly connected ONU 107 and the OLT is longer than the farthest ONU ("No" in step S13), the branching ratio must be reset. This is because the branching ratio of the unequal branch optical splitter 104 is set to assume the minimum reception sensitivity of the farthest ONU 106-4 in operation and, with the ONU 107 installed farther than the ONU 106-4, light intensity of a downstream signal output from the optical transmitter 101 in the OLT is lower than the minimum reception sensitivity of the optical receiver inside the ONU 107. Specifically, the downstream signal light intensity is lower than the minimum reception sensitivity by an amount corresponding to a transmission path loss between the ONU 106-4 to the ONU 107. When the branching ratio needs to be reset, the branching ratios X, Y, and Z are set so that an output of the branch port $P_{D4}$ of the unequal branch optical splitter 104 to which the ONU 107 is connected is 100% (step S14). Specifically, by setting X=Y=Z=0% so that output to the merge port $P_M$ to the branch port $P_{D4}$ is 100%, (1−X)=(1−Y)=(1−Z)=100% is satisfied and light input from the merge port $P_M$ can be guided to the branch port PD4 at 100% output (technically, not 100% due to connection loss and coupling loss at the branch unit 113).

In addition, ranging from the OLT 100 to the ONU 107 is executed (step S15). Using a result thereof, the control apparatus 108 resets the branching ratio of the unequal branch optical splitter 104 (step S16).

Next, an operation of the control apparatus 108 in cooperation with the operation system 118 will be described. The control apparatus 108 reads respective distances of the farthest ONU 106-2 (distance $L_2$) that is subordinate to the branch port $P_{D2}$, the farthest ONU 106-3 (distance $L_3$) that is subordinate to the branch port $P_{D3}$, and the farthest ONU 106-4 (distance $L_4$) that is subordinate to the branch port $P_{D4}$ before connecting the ONU 107 from the MAC-LSI 117 which manages the ranging function. The control apparatus 108 calculates the branching ratios X, Y, and Z, automatically sets X, Y, and Z by instructing the unequal branch optical splitter 104 of calculation results thereof, and attempts to extend the distance of the ONU that is subordinate to the branch port $P_{D1}$.

Figure 6:
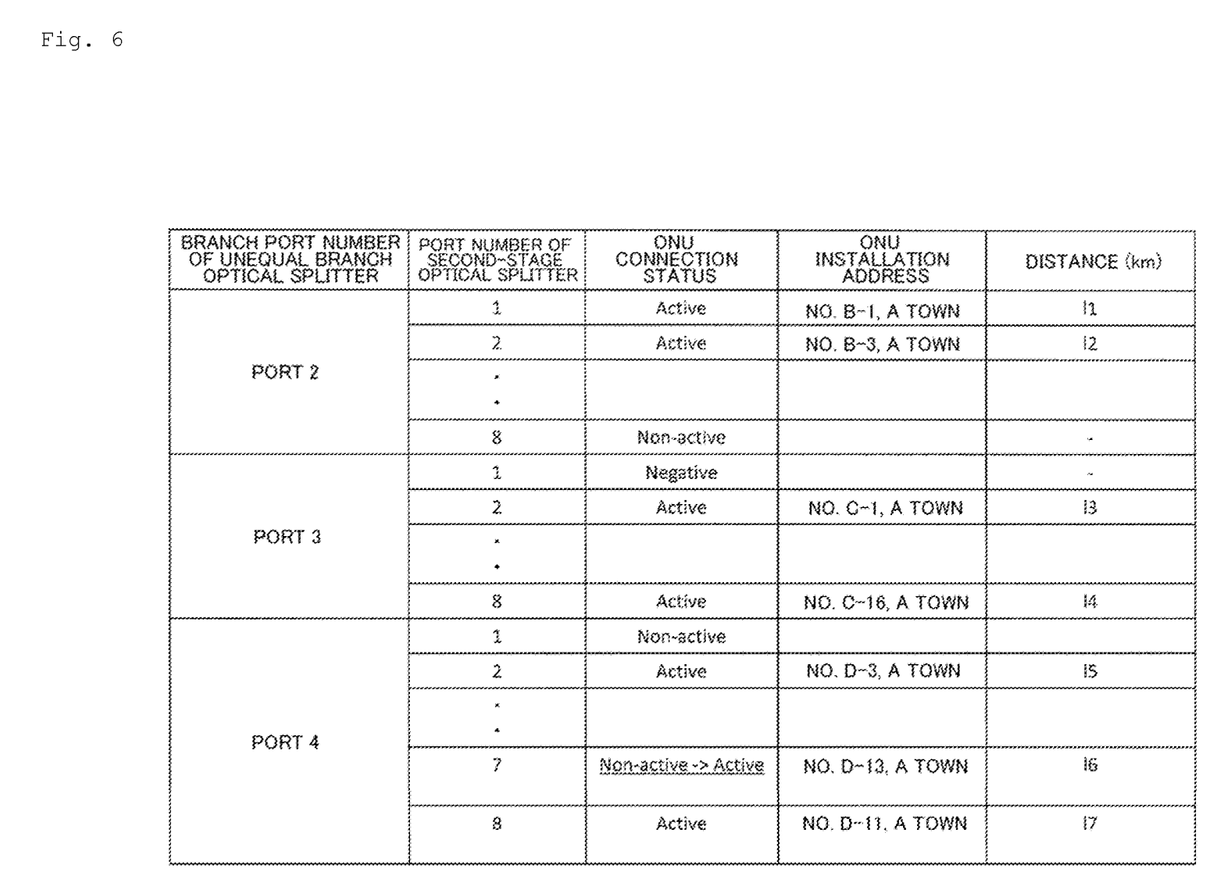
FIG. 6 is a diagram for describing a database included in the optical communication system according to the present invention.

The operation system 118 inputs, for example, address information at the time of application for connection to the SP management information DB 109. As shown in FIG. 6, the SP management information DB 109 has columns of the number of the branch port $P_D$ of the unequal branch optical splitter 104, the port number of the second-stage optical splitter 105, a connection status of an ONU connected to a port of the optical splitter 105, and a distance corresponding to the address information input from the operation system 118.

The calculating apparatus 110 executes step S13 in FIG. 2 based on the address information from the SP management information DB 109 and determines whether or not the branching ratio needs to be reset. When a reset is necessary, the calculating apparatus 110 notifies the setting information transmitting unit 112 of a result thereof and extracts, from the SP setting information DB 111, a voltage value corresponding to branching ratios
X=Y=Z=0,
(1−x)=(1−Y)=(1−Z)=100%
which cause input/output of the branch port $P_{D4}$ of an unbranched optical splitter 104 to which the newly-connected ONU 107 is to be connected to be 100%. For example, the SP setting information DB 111 has a table describing a branching ratio, a distance (Lx, Ly, Lz) between fiber cores corresponding to the branching ratio, and a voltage value corresponding to the distance between the fiber cores.

Figure 7:
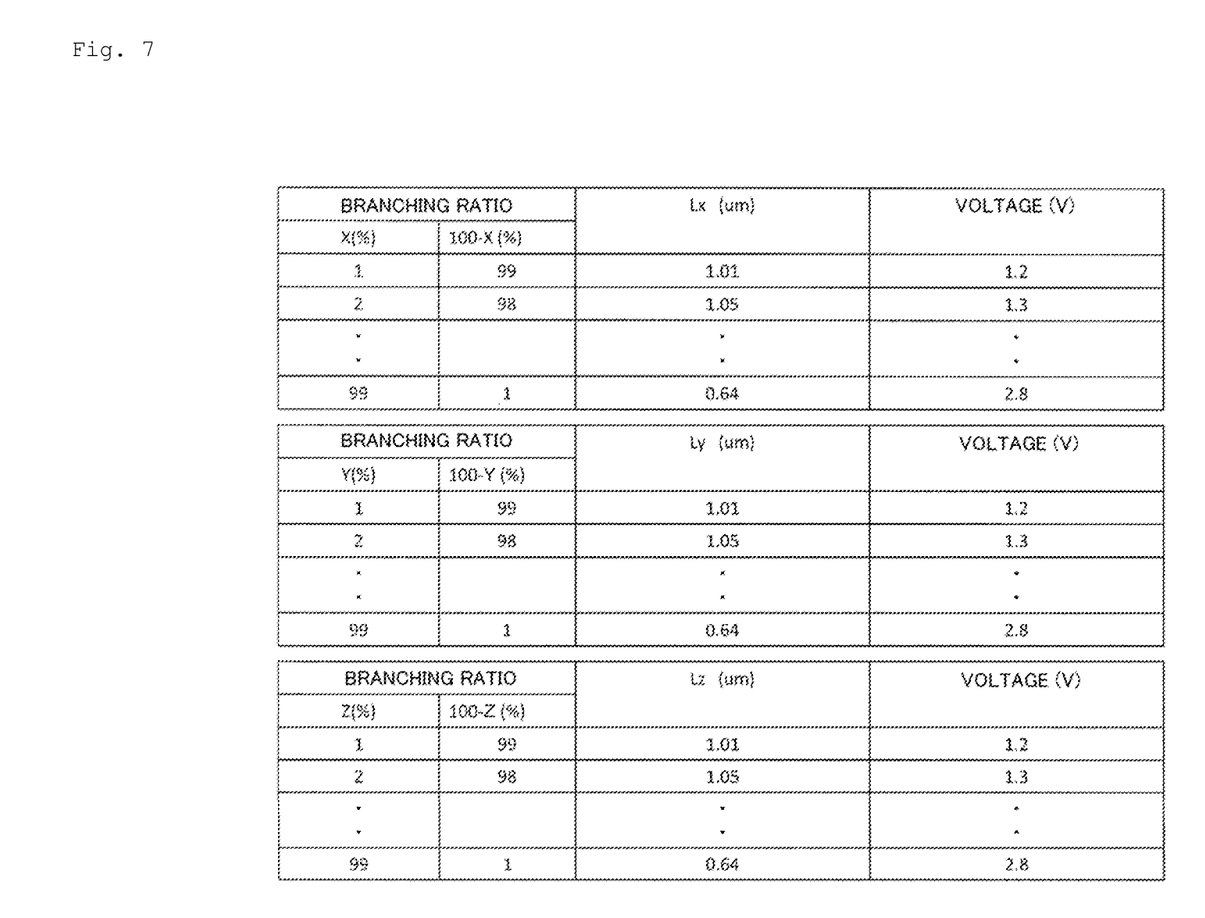
FIG. 7 is a diagram for describing a database included in the optical communication system according to the present invention.

The setting information transmitting unit 112 extracts a corresponding voltage value from the SP setting information DB 111 using values of the branching ratios X, Y, and Z as a key and inputs the value to the input IFs 119-1 to 119-3. The drive stage 116 is, for example, a piezo actuator and is capable of setting the distances Lx to Lz or, in other words, determining the branching ratios X, Y, and Z based on the input voltage value according to an inverse piezoelectric effect.

After ranging of the ONU 107, a result thereof is stored in the SP management information DB 109 via the MAC-LSI 117. For example, in FIG. 6, a distance l2 of the ONU 106-2 connected to port number 2 of the optical splitter 105-2 that is subordinate to the branch port $P_{D2}$ (l2 is farthest under the branch port $P_{D2}$), a distance l4 of the ONU 106-3 connected to port number 8 of the optical splitter 105-3 that is subordinate to the branch port $P_{D3}$ (l4 is farthest under the branch port $P_{D3}$), and a distance l6 of the ONU 107 connected to port number 7 of the optical splitter 105-4 that is subordinate to the branch port $P_{D4}$ (the newly connected ONU 107 is farthest under the branch port $P_{D4}$) are extracted.

The calculating apparatus 110 determines the branching ratios X, Y, and Z by substituting extracted L2=l2, L3=l4, and L4=l6 into expressions (1) to (3) in NPL 1 and calculating the expressions. Based on a result thereof, the setting information transmitting unit 112 extracts voltage values corresponding to the branching ratios from the SP setting information DB 111 and inputs the value to the input IFs 119-1 to 119-3.

As described above, the optical communication system 301 automatically adjusts the branching ratios X, Y, and Z of each branch unit 113 so that each beam of light output from the farthest ONU that is subordinately connected to each branch port $P_D$ of the unequal branch optical splitter 104 arrives at minimum reception sensitivity of the receiver (Rx 102) of the OLT 110. Accordingly, even with respect to a newly connected ONU, the optical communication system 301 is capable of establishing communication with all ONUS subordinate to an OLT and, at the same time, extending a transmission-reached distance of a farthest user connected to a branch port $P_{D1}$ or increasing the number of connectible users.

While the drive stage 116 is described as being a piezo actuator for the sake of brevity in the present embodiment, a configuration of the drive stage 116 is not limited thereto. The drive stage 116 may be configured in anyway as long as the ranging function of the MAC-LSI 117 enables the branching ratios X, Y, and Z to be calculated using a farthest distance among ONUS subordinately connected to each branch port $P_D$ of the unequal branch optical splitter 104 and a result thereof can be automatically fed back to the unequal branch optical splitter 104.

Second Embodiment

Figure 3:
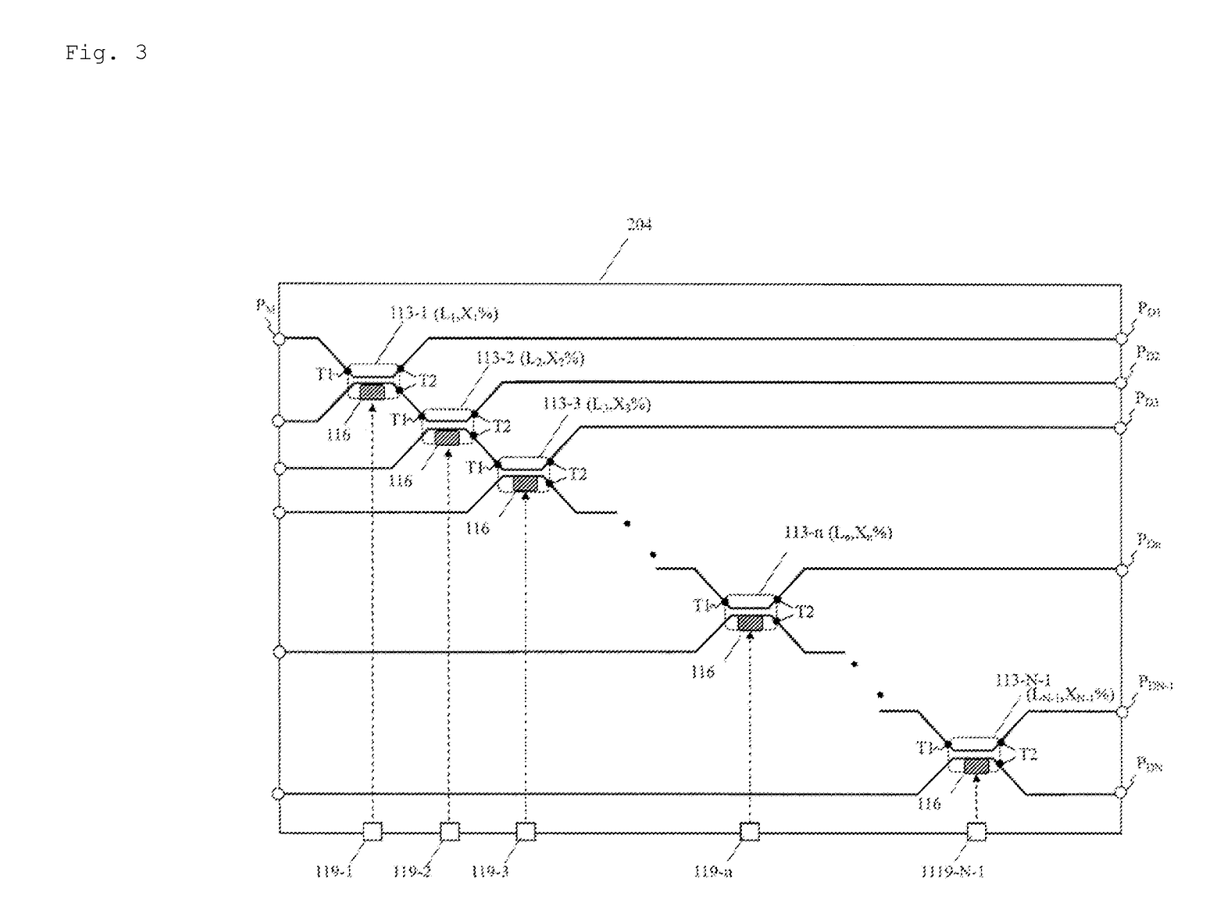
FIG. 3 is a diagram for describing an unequal branch optical splitter included in the optical communication system according to the present invention.

FIG. 3 is a diagram for describing an unequal branch optical splitter 204 with an alternative configuration.

The difference between the unequal branch optical splitter 204 and the unequal branch optical splitter 104 according to the first embodiment is that there are N branches (where N is an integer equal to or larger than 2) of which a branching ratio is variable. 113-1 denotes a first branch unit, 113-2 denotes a second branch unit, 113-3 denotes a third branch unit, 113-$n$ denotes an n-th (where n is an integer equal to or larger than 2 and smaller than N) branch unit, 113-N−1 denotes an (N−1)-th branch unit, 116 denotes a drive stage installed in the first to (N−1)-th branch units, and 119-1 to 119-N−1 denote input IFs to drive stages installed in the first to (N−1)-th branch units. In this case, a feature of the unequal branch optical splitter 204 is that the unequal branch optical splitter 204 realizes a chain-linked configuration in which one of two paths from an n-th branch unit is connected to an n+1-th branch unit and creates N-number of branches from a merge port $P_M$ to a branch port $P_D$.

The unequal branch optical splitter 204 according to the present embodiment is capable of producing a similar effect to the first embodiment by also operating in accordance with the flow shown in FIG. 2 when an ONU is newly connected and causing the SP management information DB 109 to have a table including up to the branch port PDN and causing the SP setting information DB 111 to have a table including a branching ratio of each branch unit 113, a distance ($L_1$, $L_2$, $L_3$, . . . , $L_n$, . . . , $L_{N-1}$) between fiber cores corresponding to the branching ratio of each branch unit 113, and a voltage value corresponding to the distance between the fiber cores of each branch unit 113.

The optical communication system including the unequal branch optical splitter 204 with N-number of branches automatically adjusts the branching ratios X, Y, and Z of each branch unit 113 so that each beam of light output from the farthest ONU that is subordinately connected to each branch port $P_D$ arrives at minimum reception sensitivity of the receiver (Rx 102) of the OLT 110. Accordingly, even with respect to a newly connected ONU, the optical communication system is capable of establishing communication with all ONUS subordinate to the OLT and, at the same time, extending a transmission-reached distance of a farthest user to be connected to a branch port $P_{D1}$ or increasing the number of connectible users.

Third Embodiment

Figure 4:
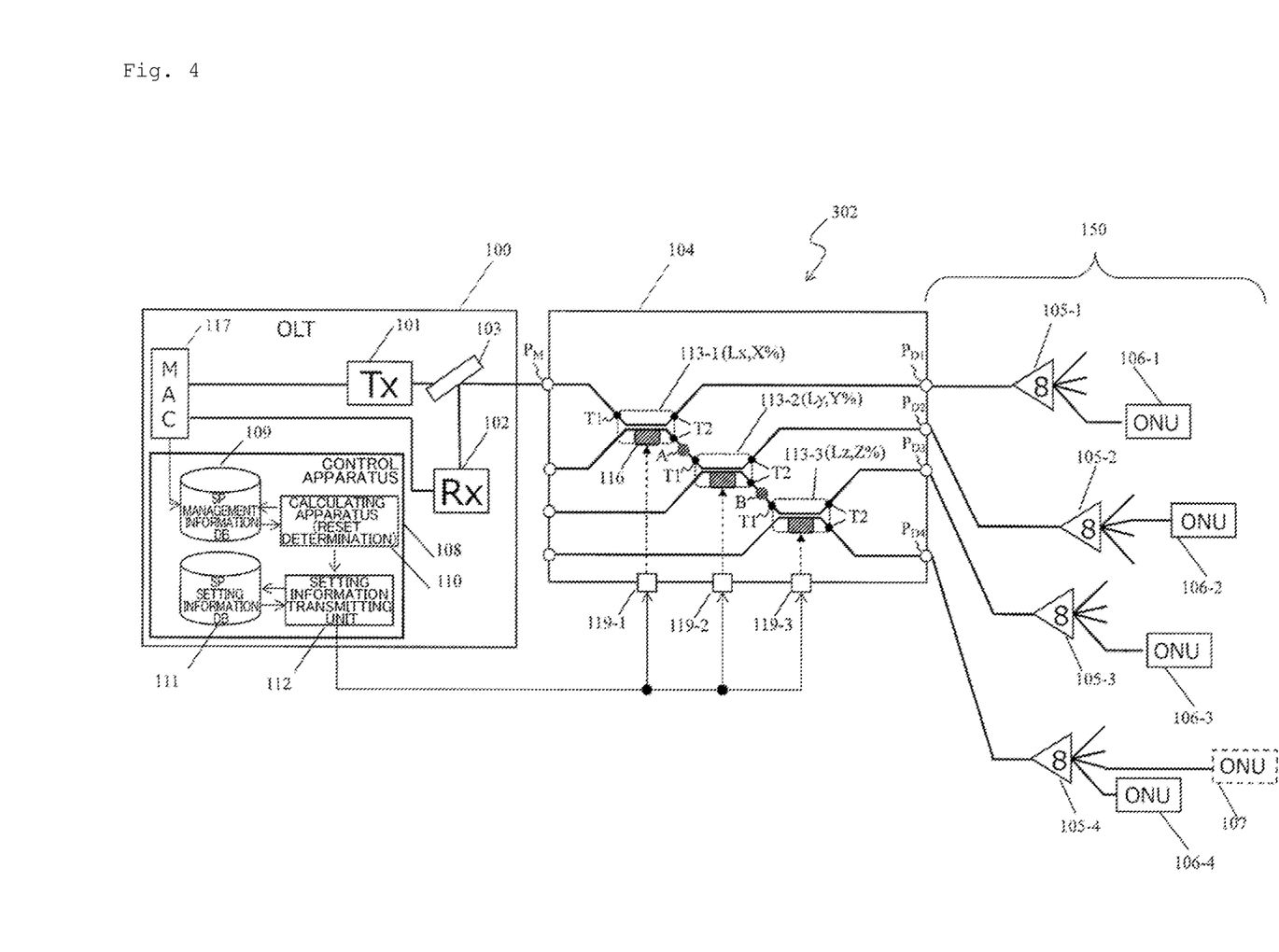
FIG. 4 is a diagram for describing an optical communication system according to the present invention.

FIG. 4 is a diagram illustrating an optical communication system 302 according to the present embodiment. The difference between the optical communication system 302 and the optical communication system 301 according to the first embodiment is that the operation system 118 which manages address information at the time of application for connection and the like has been eliminated.

A function stack of a PON system defined in the IEEE 802.3 Standard includes a function referred to as a Multipoint MAC Control sublayer, which in turn includes a "GATE frame" for giving transmission permission to an ONU and a "REPORT frame" for notifying an OLT of a transmission request from an ONU. The GATE frame is calculated according to a DBA (Dynamic bandwidth Allocation) algorithm. In other words, the DBA algorithm enables transmission control (permit or deny transmission of an upstream signal) of an ONU. In addition, when an ONU is connected to the PON system, the newly connected ONU can be detected by a P2MP discovery function.

Figure 5:
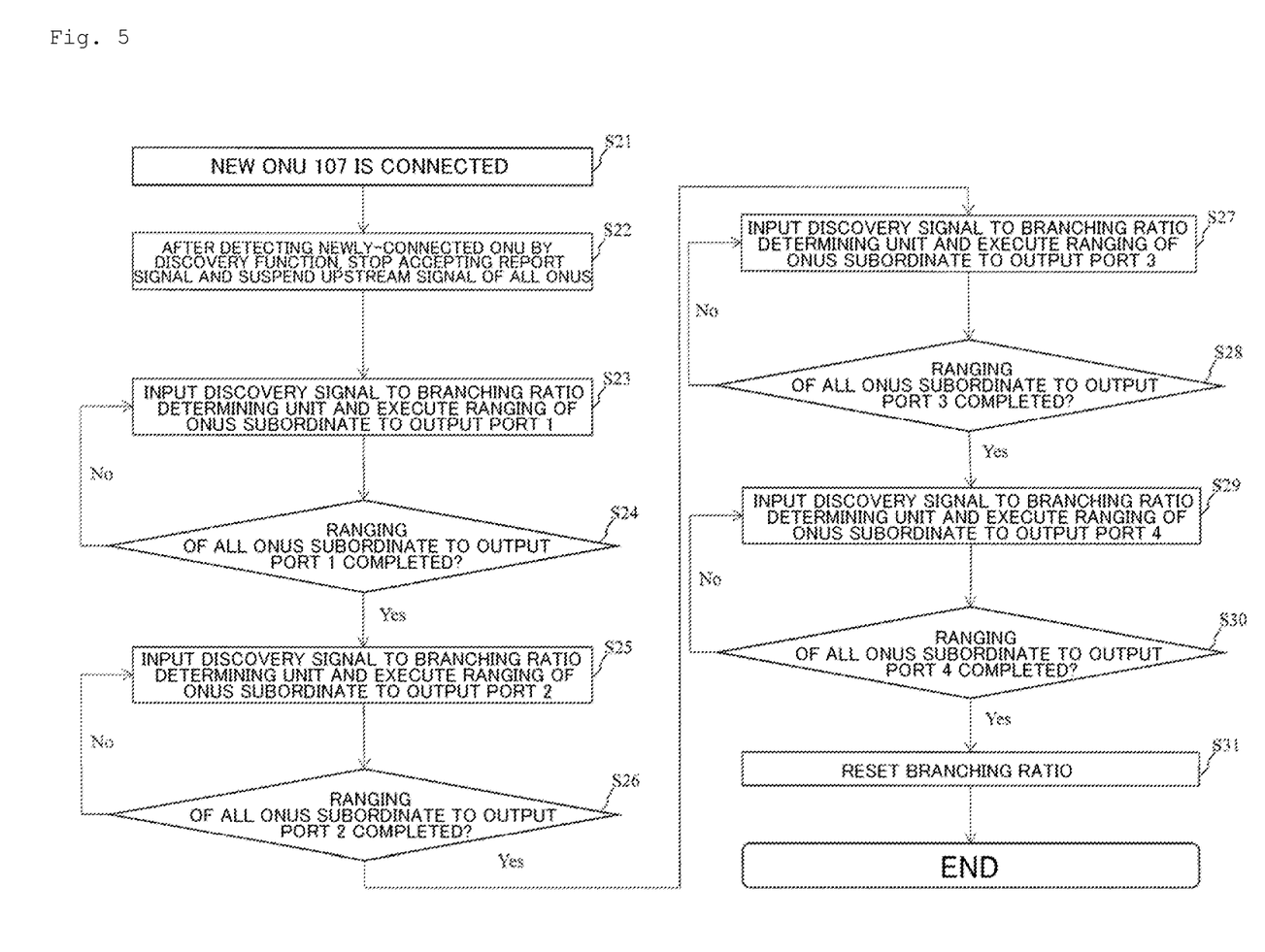
FIG. 5 is a flow chart for describing a control method according to the present invention.

FIG. 5 is a flowchart regarding a branching ratio setting when an ONU (the ONU 107 in FIG. 4) is newly connected to the system in operation. In the present embodiment, a case where the control apparatus performs the second method will be described. The second method includes: when a discovery function detects that the new ONU 107 has been connected (step S21), stopping acceptance of a REPORT signal and suspending an upstream signal of all ONUS (step S22);

for each of the branch ports $P_D$, instructing the varying mechanism 116 to set a branching ratio of light to the branch port to 100%, performing ranging with respect to all of the ONUS (106 and 107) connected to the branch port, and acquiring a distance between the ONU (106 or 107) and the OLT 100 (steps S23 to S30);

after performing ranging with respect to all branch ports $P_D$, calculating a branching ratio of light to each of the branch ports $P_D$ based on all of the distances obtained as a result of the ranging; and instructing all of the varying mechanisms 116 so that the branching ratio of light is set (step S31).

Using a detection of the discovery signal described earlier as a trigger, the OLT 100 stops accepting a REPORT signal from all of the ONUS and suspends permission to transmit an upstream signal (step S22). The OLT 100 sequentially re-executes ranging with respect to all of the ONUs in accordance with the DBA algorithm (steps S23 to S30). Specifically, a discovery signal is input to the control apparatus 108 in order to perform ranging of ONUs subordinately connected to the branch port $P_{D1}$ of the unequal branch optical splitter 104 and Lx is controlled based on the SP setting information DB 111 so that signal output from the branch port $P_{D1}$ is X=100%. After setting the signal output from the branch port $P_{D1}$ to X=100%, the OLT 100 exchanges control frames with the ONUs subordinately connected to the branch port $P_{D1}$ and sequentially measures distances between the OLT 100 and the ONUs based on RTTs (Round Trip Times). It should be noted that, in steps S24, S26, S28, and S30, whether or not ranging has been completed can be determined using a date and time of update of a time stamp or the like.

After ranging with all of the ONUs subordinate to the branch port $P_{D1}$ is completed, in order to perform ranging with ONUs subordinately connected to the branch port $P_{D2}$ of the unequal branch optical splitter 104, Lx and Ly are controlled based on the SP setting information DB 111 so that X=0% and Y=100% are satisfied. In this manner, by sequentially performing ranging with the ONUs subordinately connected to each branch port $P_D$ of the unequal branch optical splitter 104, distances between the OLT and the ONUs including the newly connected ONU 107 are measured.

The calculating apparatus 110 determines the branching ratios X, Y, and Z by substituting the measured distances into expressions (1) to (3) in NPL 1 and calculating the expressions. Based on a result thereof, the setting information transmitting unit 112 extracts a voltage value corresponding to the branching ratio from the SP setting information DB 111 and inputs the value to the input IFs 119-1 to 119-3. Accordingly, reset of the branching ratio is completed (step S31).

As described above, the optical communication system 402 automatically adjusts the branching ratios X, Y, and Z of each branch unit 113 so that, for each branch port of the unequal branch optical splitter 104, each beam of light output from the farthest ONU arrives at minimum reception sensitivity of the receiver (Rx 102) of the OLT 100. Accordingly, even with respect to a newly connected ONU, communication with all ONUS subordinate to the OLT can be established and, at the same time, a transmission-reached distance of a farthest user to be connected to the branch port $P_{D1}$ can be extended or the number of connectible users can be increased.

While the present embodiment adopts the four-branch unequal branch optical splitter 104 as shown in FIG. 4 for the sake of brevity, even with the N-branch unequal branch optical splitter 204 according to the second embodiment, a similar effect can be produced by executing ranging for each branch port $P_D$.

Effects of the Invention

According to the present invention, by providing a PON system which takes into consideration an initial connection sequence of an ONU and which automatically adjusts a branching ratio of an optical splitter, even when a user newly subscribes to a service, a transmission-reached distance of a farthest user can be automatically extended while taking an uneven user distribution into consideration or the number of connectible users can be increased.

REFERENCE SIGNS LIST

100 OLT
101 Optical transmitter transmitting downstream signal
102 Optical receiver receiving upstream signal
103 Transmission/reception separating filter for realizing single-core bidirectional communication
104, 204 Branching ratio-variable type unequal branch optical splitter
105-1 to 105-4 Optical splitter having symmetrical structure
106-1 to 106-4 ONU
107 ONU to be newly connected
108 Control apparatus
109 Optical splitter management information database (SP management information DB)
110 Calculating apparatus
111 Splitter setting information database (SP setting information DB)
112 Setting information transmitting unit
113-1, . . . , 113-$n$, . . . , 113-N−1 Branch unit
116 Drive stage
117 MAC-LSI (Media Access Control Large Scale Integration)
118 Operation system
119-1, . . . , 119-$n$, . . . , 119-N−1 Input IF
301, 302 Optical communication system

The invention claimed is:

1. An optical communication system comprising a single unequal branch optical splitter which is configured to vary a branching ratio of light and a control apparatus,
the unequal branch optical splitter including:
a single merge port to which an OLT (Optical Line Terminal) is connected;
N-number (where N is an integer equal to or larger than 2) of branch ports to which a PON (Passive Optical Network) including an ONU (Optical Network Unit) is connected; and
N−1-number of branch units including a single first port on a side of the merge port, two second ports on a side of the branch port, and a varying mechanism which varies the branching ratio of light from the first port to each of the second ports under an instruction from the control apparatus, wherein
the branch units are coupled such that one of the second ports is connected to the branch port and the other of the second ports is connected to the first port of the branch unit of a next stage,
in the branch unit of a first stage among the branch units, the first port is connected to the merge port, and in the branch unit of a final stage, the second ports are respectively connected to the branch port, and
the control apparatus is configured to perform one of a first process and a second process,
in the first process:
the control apparatus includes a management information database which stores information of the branch ports to which the ONUs are connected and distances between the OLT and each of the ONUs;
when a new ONU of the ONUs is connected and a distance between the new ONU and the OLT is longer than any of the distances stored in the management information database, the control apparatus is configured to:
instruct the varying mechanism to set the branching ratio of light to the branch port to which the new ONU is connected to 100%;
perform ranging with respect to the new ONU and acquire a distance between the new ONU and the OLT as a result of the ranging;
calculate the branching ratio of light to each of the branch ports based on all of the distances including the distance to the new ONU; and
instruct all of the varying mechanisms so that the branching ratio of light is set, and
in the second process:
when a discovery function of the control apparatus detects that a new ONU of the ONUs is connected, the control apparatus is configured to:
instruct, for each of the branch ports, the varying mechanism to set the branching ratio of light to the branch port to 100%;
perform ranging with respect to all of the ONUs connected to the branch port;
acquire distances between each of the ONUs and the OLT;
calculate the branching ratio of light to each of the branch ports based on all of the distances obtained as a result of the ranging after performing the ranging with respect to all of the branch ports; and
instruct all of the varying mechanisms so that the branching ratio of light is set.

2. The optical communication system according to claim 1,
wherein each of the branch units has an input interface,
the input interface is configured to receive a branching voltage corresponding to the branching ratio of light from the control apparatus, and
the input interface is configured to transfer the branching voltage to a corresponding varying mechanism of the varying mechanisms to vary the branching ratio of light for a corresponding branch unit of the branch units.

3. A control method of an optical communication system comprising a management information database and a single unequal branch optical splitter which is configured to vary a branching ratio of light,
the unequal branch optical splitter including:
a single merge port to which an OLT (Optical Line Terminal) is connected;

N-number (where N is an integer equal to or larger than 2) of branch ports to which a PON (Passive Optical Network) including an ONU (Optical Network Unit) is connected; and N−1-number of branch units including a single first port on a side of the merge port, two second ports on a side of the branch port, and a varying mechanism which varies the branching ratio of light from the first port to each of the second ports under an instruction from an outside, wherein the branch units are coupled such that one of the second ports is connected to the branch port and the other of the second ports is connected to the first port of the branch unit of a next stage, in the branch unit of a first stage among the branch units, the first port is connected to the merge port, and in the branch unit of a final stage, the second ports are respectively connected to the branch port, and the management information database stores information of the branch ports to which the ONUs are connected and distances between the OLT and each of the ONUs, the control method comprising the steps of:
when a new ONU of the ONUs is connected and a distance between the new ONU and the OLT is longer than any of the distances stored in the management information database,
instructing the varying mechanism to set the branching ratio of light to the branch port to which the new ONU is connected to 100%;
performing ranging with respect to the new ONU and acquiring a distance between the new ONU and the OLT as a result of the ranging;
calculating the branching ratio of light to each of the branch ports based on all of the distances including the distance to the new ONU; and
instructing all of the varying mechanisms so that the branching ratio of light is set.

4. The control method according to claim 3,
wherein each of the branch units has an input interface,
the input interface is configured to receive a branching voltage corresponding to the branching ratio of light from a control apparatus located at the outside, and
the input interface is configured to transfer the branching voltage to a corresponding varying mechanism of the varying mechanisms to vary the branching ratio of light for a corresponding branch unit of the branch units.

5. A control method of an optical communication system comprising a single unequal branch optical splitter which is configured to vary a branching ratio of light,
the unequal branch optical splitter including:
a single merge port to which an OLT (Optical Line Terminal) is connected;
N-number (where N is an integer equal to or larger than 2) of branch ports to which a PON (Passive Optical Network) including an ONU (Optical Network Unit) is connected; and
N−1-number of branch units including a single first port on a side of the merge port, two second ports on a side of the branch port, and a varying mechanism which varies the branching ratio of light from the first port to each of the second ports under an instruction from an outside, wherein
the branch units are coupled such that one of the second ports is connected to the branch port and the other of the second ports is connected to the first port of the branch unit of a next stage,
in the branch unit of a first stage among the branch units, the first port is connected to the merge port, and in the branch unit of a final stage, the second ports are respectively connected to the branch port, and
the control method comprising the steps of:
when a discovery function detects that a new ONU of the ONUs is connected,
instructing, for each of the branch ports, the varying mechanism to set the branching ratio of light to the branch port to 100%;
performing ranging with respect to all of the ONUs connected to the branch port;
acquiring distances between each of the ONUs and the OLT;
calculating the branching ratio of light to each of the branch ports based on all of the distances obtained as a result of the ranging after performing the ranging with respect to all of the branch ports; and
instructing all of the varying mechanisms so that the branching ratio of light is set.

6. The control method according to claim 5,
wherein each of the branch units has an input interface,
the input interface is configured to receive a branching voltage corresponding to the branching ratio of light from a control apparatus located at the outside, and
the input interface is configured to transfer the branching voltage to a corresponding varying mechanism of the varying mechanisms to vary the branching ratio of light for a corresponding branch unit of the branch units.

* * * * *